United States Patent [19]

Schubert

[11] 3,747,444
[45] July 24, 1973

[54] MACHINE TOOL TRANSMISSION
[75] Inventor: Karl P. Schubert, Mayfield Heights, Ohio
[73] Assignee: Acme-Cleveland Corporation, Cleveland, Ohio
[22] Filed: Sept. 15, 1971
[21] Appl. No.: 180,696

[52] U.S. Cl. .................................. 82/28 R, 82/3
[51] Int. Cl. ...................... B23b 19/02, B23b 3/34
[58] Field of Search .............................. 82/28, 3

[56] References Cited
UNITED STATES PATENTS

| 1,959,487 | 5/1934 | Mercer | 82/3 X |
|---|---|---|---|
| 1,790,943 | 2/1931 | Mullin | 82/3 X |
| 1,574,726 | 2/1926 | Bullard, Jr. | 82/3 X |
| 688,921 | 12/1901 | Bettini | 82/3 X |
| 451,184 | 4/1891 | Manville | 82/3 |
| 3,364,788 | 1/1968 | Schubert | 82/3 X |
| 2,614,446 | 10/1952 | Miller | 82/28 X |
| 1,683,528 | 9/1928 | Carlton | 82/28 X |
| 1,417,521 | 5/1922 | Haumann | 82/28 X |

Primary Examiner—Harrison L. Hinson
Attorney—Woodling, Krost, Granger and Rust

[57] ABSTRACT

A transmission for a multiple spindle automatic machine tool is disclosed. A motor is mounted crosswise in the base of the machine and drives a single cross shaft in the machine. One end of the cross shaft is journaled in bearings which perform double duty of also journaling the inputs to a clutch and brake unit. The foregoing is merely a resume of one general application, is not a complete discussion of all principles of operation or applications, and is not to be construed as a limitation on the scope of the claimed subject matter.

17 Claims, 6 Drawing Figures

PATENTED JUL 24 1973

INVENTOR.
KARL P. SCHUBERT

BY Woodling, Krost,
Granger and Rust
ATTORNEYS.

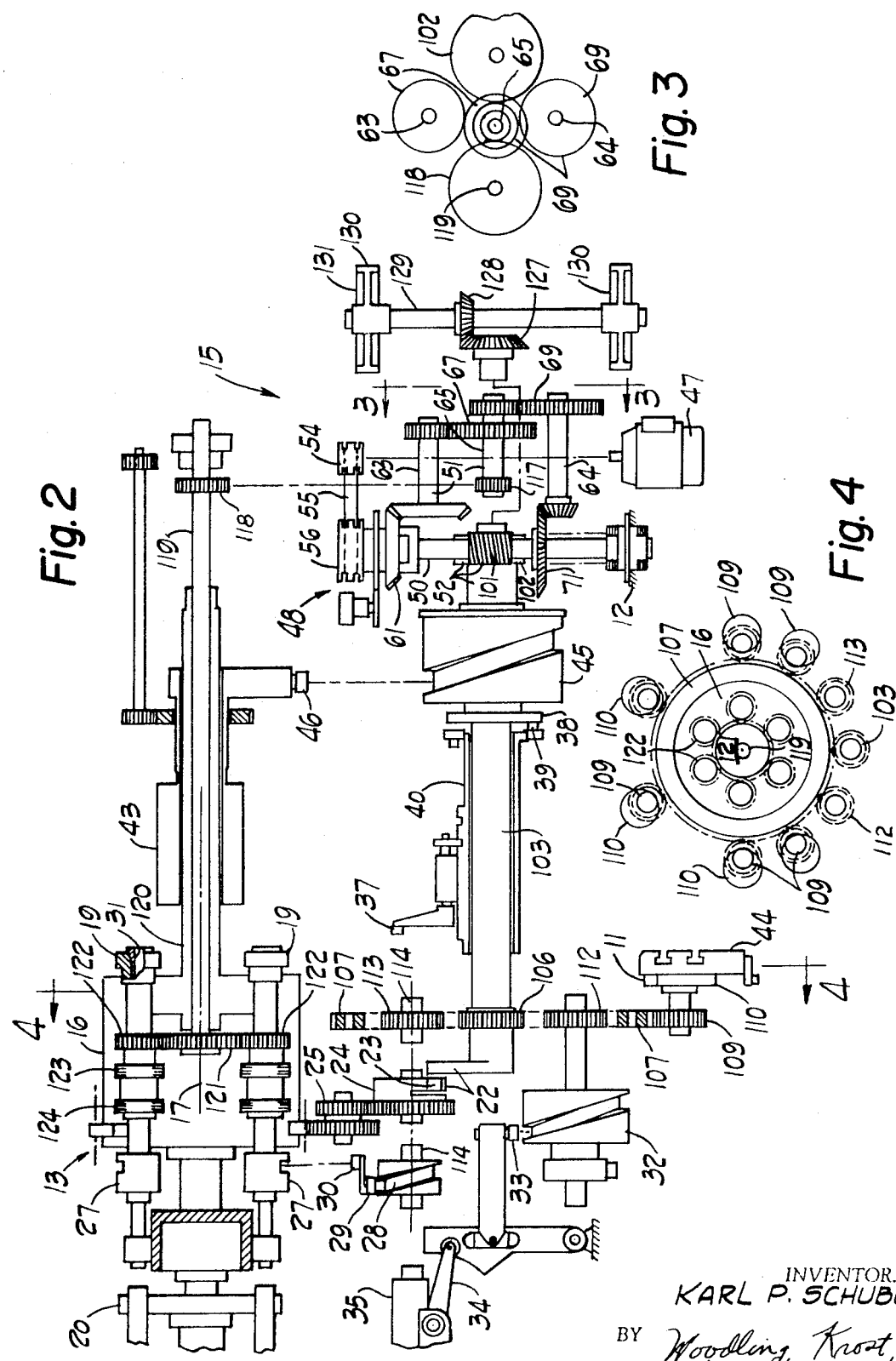

INVENTOR.
KARL P. SCHUBERT

MACHINE TOOL TRANSMISSION

BACKGROUND OF THE INVENTION

Multiple spindle automatic machine tools have been in the prior art for at least 60 years and a typical current production model is that shown in U. S. Pat. No. 2,617,175. This illustrates a six-spindle machine with the spindles in an indexable spindle carrier and most of the slow speed functions taken care of by a large slow rotating drum shaft on which drum cams are located for moving the cross slides, moving the end tool slide, stock feeding, collet opening and closing, spindle carrier indexing, and stock stop actuation. The transmission required for such a multiple spindle machine is complex and requires many gears and shafts in order to drive all the various components of such a machine tool. A typical multi-spindle automatic machine tool is one which has many longitudinal shafts plus about three cross shafts perpendicular to the longitudinal axis of the machine. This means a number of bevel or worm gears to interconnect the cross shafts and the longitudinal shafts. Additionally change gears for changing the spindle speed and changing the feed speed of the cam drum shaft are required to be accessible. These usually are changed during each changed set-up of the machine in order to produce a different workpiece. The typical machine tool is one which has a belt drive from a motor to a belt sheave and often these belts obstruct access to a cover and the cover needs to be removed in order to get at these change gears. The various shafts require bearings for the shafts as well as bearings for the clutches and the gears thereon. A single shaft might have as many as ten or fifteen different bearings on it and this complicates the manufacture as well as the assembly and increases the cost of the entire machine tool.

Accordingly, an object of the invention is to provide a transmission for a multiple spindle machine tool which obviates the above-mentioned disadvantages.

Another object of the invention is to provide a machine tool transmission for a multiple-spindle machine wherein only a single cross shaft is used in the transmission.

Another object of the invention is to provide a transmission for a multiple spindle machine which permits the electric motor to be mounted transversely of the machine.

Another object of the invention is to provide a transmission for a multiple spindle machine tool which permits simplified manufacture and construction with only a single cross shaft and one end of the cross shaft is supported by bearings within a clutch/brake unit.

Another object of the invention is to provide a transmission for a multiple spindle machine tool with simplified construction of bearings doing double-duty of acting for the clutch unit and for a shaft on which the clutch is mounted.

Another object of the invention is to provide a transmission for a multiple spindle automatic machine tool with improved access to change gears to change spindle speeds and feed speeds.

Another object of the invention is to provide a transmission for a multiple spindle automatic machine wherein increased room and availability is provided for attachment drives with only a single cross shaft to increase the amount of room in the transmission or gear box area of the machine.

SUMMARY OF THE INVENTION

The invention may be incorporated in a transmission for a multiple spindle machine tool having a motor connected through the transmission to index a spindle carrier about a longitudinal axis and move plural tool slides, said transmission comprising in combination, a single cross shaft in the frame, first means connecting said motor to drive said cross sahft, second means connecting said cross shaft to index the spindle carrier and move the tool slides, and bearing means journaling said single cross shaft transversely in said frame substantially perpendicular to said longitudinal spindle carrier axis.

Other objects and a fuller understanding of the invention may be had by referring to the following description and claims, taken in conjunction with the accompanying drawing.

BRIEF DESCRIPTION OF THE DRAWING

FIG. 2 is a layout of the transmission of the machine of FIG. 1;

FIG. 3 is a sectional view on line 3—3 of FIG. 2 showing the gearing layout in the gearbox;

FIG. 4 is a sectional view on line 4—4 of FIG. 2 showing the gearing layout in the headstock;

DESCRIPTION OF THE PREFERRED EMBODIMENT

Figure 1:
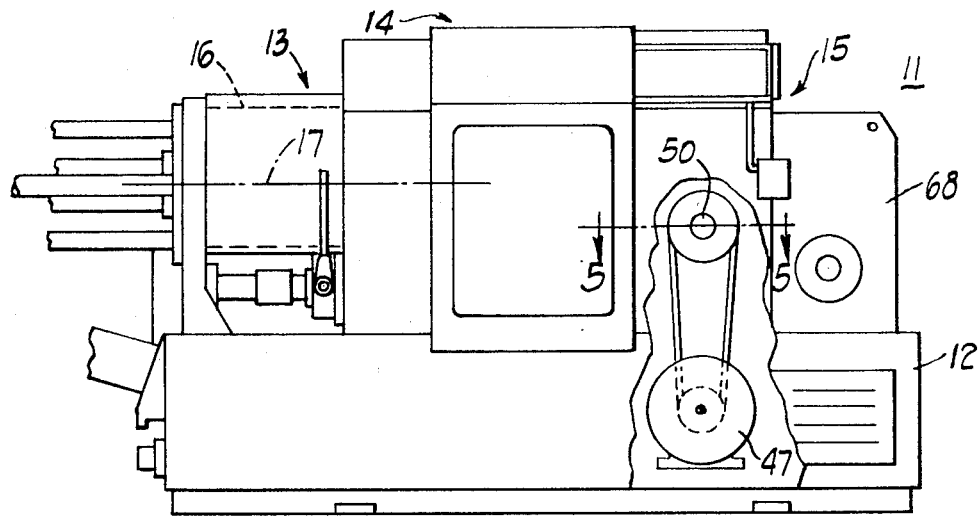
FIG. 1 is a front elevational view of a multiple spindle automatic machine embodying the invention.

The drawing shows a multiple spindle automatic machine tool 11 which has a frame 12 with a headstock end 13, a tooling area 14 and a gear box 15. The headstock 13 journals a spindle carrier 16 for indexable rotation about a longitudinal axis 17.

The spindle carrier contains multiple spindles, hence the name multiple spindle machine tool, and this may typically be four, six or eight spindles with six such spindles 19 shown in this preferred embodiment. The spindles 19 are journaled for rotation about axes parallel to the spindle carrier axis 16. In this preferred embodiment the machine is shown as a bar machine as distinguished from a chucking machine and this means that the spindles 19 have hollow shafts to accept long bar workpieces extending through the spindles and through the spindle carrier 16. A spider 20 is shown in FIG. 2 to support the front end of the six bar stock reel which indexes with the spindle carrier 16 and is capable of holding the supply of bar stock to be cut into successive workpieces.

The spindle carrier 16 is provided with an indexing means 22 which includes an actuating roller 23, a Geneva mechanism 24 and gearing 25 to index the spindle carrier 16 an appropriate amount, 60° in this case of six spindles. The spindles 19 are provided with conventional collets 31 that are actuated between open and closed position by fingerholder assemblies 27. An actuator for these collets is provided in a cam 28, a cam follower 29 and an actuating shoe 30 to longitudinally move the spool of the fingerholder assemblies 27 as a particular spindle is indexed into the collet actuating position. During the time that the collet is open, bar stock may be fed forwardly, the old workpiece having been previously been cut off the end of the bar stock. A stock feeder is provided including a cam 32, a cam follower 33, variable stroke levers 34 and a stock pusher 35. This stock pusher feeds the bar stock forwardly when the collet is open. A stock stop 37 is provided in the tooling area 14 in order to stop the forward movement of the bar stock at the proper predeterminable position. This stock stop is actuated between active and inactive positions by a cam 38, cam follower 39 and a stock stop support tube 40.

The tooling area 14 is the area at which the workpieces are cut from the ends of the bar stock by means of tools carried on movable tool supports. In this preferred embodiment the movable tool supports are tool slides including a main or end tool slide 43 which is longitudinally movable and coaxial about the spindle carrier axis 17. A cam 45 cooperates with a cam follower 46 to longitudinally reciprocate this main or end tool slide 43. Also, cross tool slides 44 are provided usually one for each of the spindles. These cross tool slides move generally perpendicularly to the spindle carrier axis 17. In this manner both end working and working on the periphery of the workpiece is possible. In FIG. 2 only one of these cross slides 44 is shown to avoid complicating the drawing.

Figure 5:
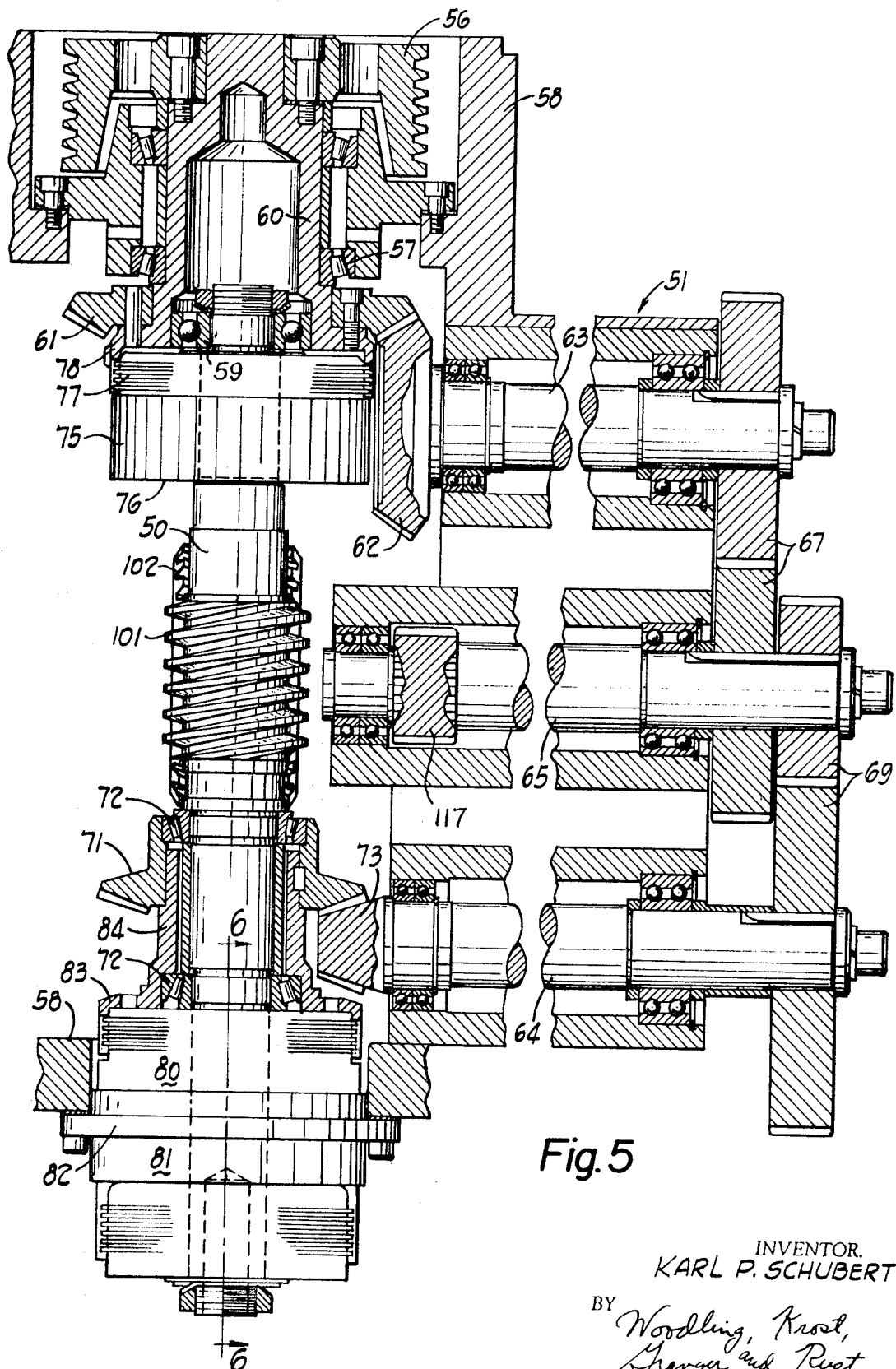
FIG. 5 is an enlarged sectional view on line 5—5 of FIG. 1 showing the cross shaft; and, FIG. 6 is an enlarged sectional view on line 6—6 of FIG. 4 showing the clutch/brake unit.

FIG. 2 shows the details of construction of the gearbox 15. A motor 47 is provided inside the frame 12 near the base of the machine tool 11. This motor is positioned crosswise of the machine tool 11, perpendicular to the longitudinal spindle carrier axis 17, as distinguished from the usual longitudinal position. The gearbox 15 includes a transmission 48 with this transmission 48 including only a single cross shaft 50 to drive all of the aforementioned machine functions. A first connecting means 51 connects the cross shaft 50 to be driven from the electric motor 47 and a second connecting means 52 connects the cross shaft 50 to drive each of the aforementioned machine functions. The first connecting means 51 includes a belt pulley 54 on the motor driving through belts 55 to a belt sheave 56 coaxial with and journaled by bearings 57 on the single cross shaft 50, see FIG. 5. The bearings 57 are supported in the gearbox frame 58 which is a part of the entire frame 12. Because the cross shaft 50 does not always rotate with the sheave 56, as explained below, the one end of the cross shaft 50 is supported in and journaled by bearings 59 within a hub 60 to which the sheave 56 is attached and to which a high speed bevel gear 61 is fixed.

A bevel drive gear 62 meshes with the gear 61 and gear 62 is fixed to a spindle speed shaft 63 journaled within the gearbox frame 58 on an axis parallel to the spindle carrier axis 17. A feed speed shaft 64 and an idler shaft 65 are also journaled in the gear box frame 58 parallel to this longitudinal spindle carrier axis 17. Spindle speed change gears 67 are provided on the outboard ends of the spindle speed and idler shafts 63 and 65 in a position easily accessible underneath a removable cover 68 at the rear of the gearbox 15. Also, feed change gears 69 are provided on the outboard ends of the feed and idler shafts 64 and 65, similarly easily available. A feed speed bevel gear 71 is journaled coaxially with the single cross shaft 60 on bearings 72, because this gear 71 does not always rotate with the cross shaft 50 as explained below. The bevel gear 71 meshes with a bevel gear 73 fixed on the feed speed shaft 64.

Figure 6:
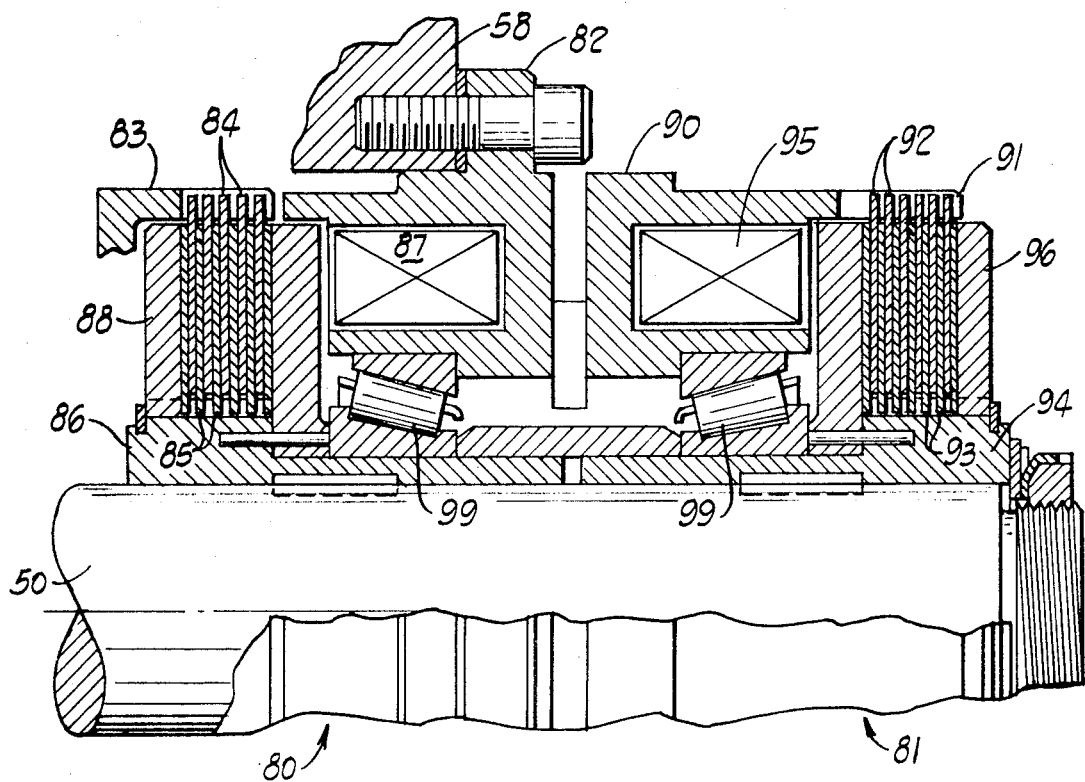

An electric clutch 75 has a stationary shell 76 and when actuated has multiple discs 77 to clutch together the cross shaft 50 and the input fingers 78 attached to the high speed bevel gear 61. A double clutch unit 80, 81 is provided at the front end of the cross shaft 50. This double clutch unit 80, 81 has a stationary shell 82 which is fixed to the gear box frame 58. FIG. 6 better shows the internal construction of this double clutch unit. Fingers 83 extend from a hub 84, FIG. 5, fixed to the feed speed bevel gear 71. These fingers 83 are interlocked with a first set of multiple discs 84. This set of discs is interleaved with a second set of multiple discs 85 which are keyed to a hub 86 in turn keyed the cross shaft 50. The stationary shell 82 supports a stationary electrical coil 87. This establishes a flux which passes through the intermeshed multiple discs 84 and 85 to attract an armature 88 toward the coil 87 and when so attracted the discs are frictionally engaged to clutch together the gear fingers 83 and the cross shaft 50 to drive the cross shaft at a feed speed.

The other half of the double clutch unit 80, 81 is quite similar to the clutch unit 80. A stationary shell 90 is fixed to the gear box frame 58 by means of the stationary shell 82 and this shell 90 carries fingers 91 to interlock with a first set of multiple discs 92. These discs are interleaved with a second set of multiple discs 93 which are interlocked with a hub 94 which is keyed to the cross shaft 50. The stationary shell 90 carries a stationary electric coil 95 which when electrically energized establishes a flux to attract an armature 96 and hence frictionally engage together the multiple discs 92 and 93. When this occurs, the cross shaft 50 is clutched to the fingers 91 and since these are fixed to the frame 58 this second clutch unit may also be characterized as a brake unit. This brakes the cross shaft 50 to a stop. From the above it will be seen that when the clutch 75 is engaged the cross shaft is rotated at high speed directly at the speed of the belt sheave 56, and when the clutch unit 80 is engaged, the cross shaft 50 is rotated at the speed of the bevel gear 71 which is a slower speed dependent upon the ratios of the change gears 67 and 69. The clutches 75 and 80 are alternatively engaged and when neither is engaged the brake unit 81 may be engaged to brake the cross shaft 50 to a stop.

FIG. 6 illustrates that only a single bearing means is provided at the forward end of the cross shaft 50, the bearings 99 which are combined radial and thrust bearings. These bearings journal the hubs 86 and 94 which are keyed to the cross shaft 50; hence, these bearings do double duty of supporting and journaling the cross shaft 50 and also supporting and journaling the internal hubs of the clutch/brake unit 80, 81. In the usual construction there would be bearings to journal the cross shaft and then there would be an additional set of bearings to journal the internal hubs of the clutch. This takes additional space in both the radial and longitudinal direction and takes extra parts to properly position and fasten these parts in place on the shaft and relative to the frame. The present construction eliminates the need for this extra set of bearings and extra parts for positioning and fastening. It also makes a more compact construction in both radial and longitudinal dimensions.

The first connecting means 51 includes the elements with numerals 54 through 99. The second connecting means 52 includes a worm 101 fixed to the cross shaft 50 and which meshes with a worm wheel 102 vertically below this worm 101. The worm wheel 102 is fixed on a main cam drum shaft 103. The cam drum 45 is fixed on this cam shaft 103 and cooperates with the cam follower 46 to longitudinally reciprocate the main or end tool slide 43.

The stock stop actuating cam 38 is fixed on the main cam shaft 103 to actuate the stock stop 37 between active and inactive positions. The indexing means 22 has the actuating roller 23 thereof fixed on a lever arm on the main cam shaft 103. In this preferred embodiment the main cam shaft has one revolution per cycle of operation of the machine tool and once during this revolution the roller 23 engages the Geneva mechanism 24 to index the spindle carrier 16 to the next position, a 60° index in this case.

The main cam shaft 103 also has fixed thereto a drive gear 106 which meshes with a large external ring gear 107 encircling the spindle carrier 16 and journaled relative thereto, see FIGS. 2 and 4. The ring gear 107 meshes with cross slide gears 109 to drive each of them and there are six in this preferred embodiment. Each of these cross slide gears 109 has attached thereto a cross slide cam 110. As illustrated in FIG. 2, the cross slide cam 110 cooperates with a cam follower 111 to reciprocate the respective cross slide 44 in a generally radial direction relative to its respective spindle position. The ring gear 107 also meshes with gears 112 and 113. Gear 112 drives the stock feed cam 32, see FIG. 2, and gear 113 drives the collet actuating cam 28. The gear 113 is fixed on a shaft 114 to effect this drive of the cam 28.

From the above, it will be noted that the second connecting means 52 includes cams 28, 32, 38, 45 and 110 and the Geneva mechanism 24.

The transmission 48 also establishes rotary drive of each of the spindles 19. The idler shaft 65 has a gear 117 fixed thereto which meshes with a gear 118 fixed on a spindle drive shaft 119 coaxially with the axis 17. This spindle drive shaft extends through a hollow spindle carrier stem 120 to the interior of the spindle carrier 16 whereat a central drive gear 121 is fixed to the shaft 119. This central drive gear 121 meshes with and drives six gears 122 which are journaled on each of the spindles 19. Each spindle 19 is selectively connectable through a clutch 123 to the spindle drive gear 122 or connectable through a brake 124 to the spindle carrier 16 to brake that particular spindle.

Attachment drives are provided for in the machine tool 11 and these attachment drives may be such as a pick-off attachment to grasp and pick off a workpiece as it is cut from the bar stock. Because only a single cross shaft 50 is required in the transmission 48, the gear box 15 is simplified and fewer parts are required, hence, there is more room for these attachment drives. The main cam shaft 103 has fixed thereto a gear 127 driving another gear 128 fixed on an attachment shaft 129. Cam wheels 130 are provided on each end of this shaft 129 to receive replaceable disc cams 131. These act through cam followers and levers, not shown, to reciprocate various attachments through the gearbox 15 into the tooling area 14. Beside pick-off attachments this might be drilling attachments, milling attachments and the like which need to work from the gear box end of the tooling area 14. This attachment shaft 129 is not considered a part of the main transmission 48 and the standard machine tool is supplied without attachments; hence, the main transmission is that which drives the various machine tool functions provided as a standard with such assembled machine tool. The transmission 48 is a simplified transmission yet provides all of the aforementioned drive of the machine functions. The simplification is a primary result of the single cross-shaft 50 and this permits the change gears 67, 69 to be readily accessible at the rear of the gear box 15. Also, they are not at the same level as the spindle carrier 16 but are below this level and hence this permits additional room for any attachment drives within the gear box 15.

The simplification of the transmission 48 is also aided by installation of the electric motor 47 crosswise in the base of the frame 12. This gets the motor and especially the belts 55 out of the way. In previous machine tools, to get at the speed and feed change gears it was necessary to remove a cover from behind a group of drive belts. This made removal of the cover difficult and even after the cover was removed the belts were in the way hindering the changing of the change gears. The present transmission eliminates this difficulty with the change gears 67, 69 readily accessible upon removal of the easily removable cover 68.

The bearings 99 are combined radial and thrust bearings to journal the shaft 50 and to absorb the longitudinal thrust from the clutch 80 and brake 81. These bearings 99 are the sole journaling means journaling the coaxial double input of the double clutch unit 80, 81 as well as one end of the cross shaft 50.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A transmission for a multiple spindle machine tool having a frame and having a motor connected through the transmission to index a spindle carrier about a longitudinal axis and move plural tool slides,
    said transmission comprising in combination,
    only a single cross shaft in the frame transverse to said longitudinal axis,
    first means connecting said motor to drive said cross shaft,
    second means connecting said cross shaft to index the spindle carrier and move the tool slides,
    and bearing means journaling said single cross shaft transversely in said frame substantially perpendicular to said longitudinal spindle carrier axis.

2. A transmission as set forth in claim 1, including means mounting said motor transversely of the frame and substantially parallel to said single cross shaft.

3. A transmission as set forth in claim 1, wherein said first connecting means includes first and second clutches and gearing connected to rotate said single cross shaft at two different speeds.

4. A transmission as set forth in claim 1, wherein said first connecting means includes a clutch unit,
    means fixing said clutch unit in the frame,
    and said bearing means including bearing means within said clutch unit constituting the sole journaling of one end of said cross shaft therein.

5. A transmission as set forth in claim 4, wherein said clutch unit has a selectably rotatable coaxial input fixed to said cross shaft, and said sole journaling means journaling said coaxial clutch input.

6. A transmission as set forth in claim 4, wherein said clutch unit is a part of a double clutch unit,
and said sole journaling means journals the inputs to both of said clutch units.

7. A transmission as set forth in claim 6, wherein the second part of said double clutch unit is a brake fixed to the frame.

8. A transmission as set forth in claim 1, including a gear journaled on said single cross shaft and included in said first connecting means,
and means to rotate plural spindles in the spindle carrier from said gear.

9. A transmission as set forth in claim 1, wherein said first connecting means includes speed and feed gears journaled on said cross shaft,
and longitudinally disposed speed and feed shafts with gears thereon meshing with said speed and feed gears, respectively.

10. A transmission as set forth in claim 9, wherein said speed and feed gears and gears meshing therewith are bevel gears,
said first connecting means includes change gears interconnecting said speed and feed shafts,
and an idler shaft parallel to and between said speed and feed shafts.

11. A transmission as set forth in claim 9, wherein said first connecting means includes a clutch to connect said speed gear to said cross shaft and a clutch to connect said feed gear to said cross shaft.

12. A transmission as set forth in claim 1, including bar workpiece feeding means in the machine tool,
and said second connecting means connects said cross shaft to drive said workpiece feeding means.

13. A transmission as set forth in claim 1, including workpiece gripping collets in the spindles and actuating means to open and close said collets,
and said second connecting means connects said cross shaft to said collet acutating means.

14. A transmission as set forth in claim 1, including bar workpiece feeding and stop means and stop actuating means in the machine tool,
and said second connecting means connects said cross shaft to said stop actuating means.

15. A transmission as set forth in claim 1, including a given plurality of cross tool slides and plural spindles equal in number thereto in the machine tool,
and said second connecting means connects said single cross shaft to move all of the tool slides.

16. A transmission as set forth in claim 1, wherein the movable tool slides includes a longitudinally movable end tool slide and plural cross tool slides,
and said second connecting means connects said single cross shaft to move all said tool slides.

17. A transmission as set forth in claim 1, wherein said second connecting means includes a worm on said single cross shaft,
and a worm wheel meshing with said worm and connected to drive the spindle carrier index and move the plural tool slides.

* * * * *